Patented Apr. 28, 1936

2,039,070

UNITED STATES PATENT OFFICE 2,039,070

TREATMENT OF SULPHUR

Werner W. Duecker, Pittsburgh, Pa., assignor to Texas Gulf Sulphur Company, a corporation of Texas No Drawing. Application April 3, 1935, Serial No. 14,470

10 Claims. (Cl. 106—22)

This invention relates to the treatment of sulphur, and consists both in the method of treatment and in the product. The object in view is, by treatment, to modify the crystallizing habit of sulphur and obtain a product that will continue for relatively long periods of time, or perhaps permanently, in non-crystalline condition; and a product, furthermore, that will be of plastic nature. This application is a continuation in part of an application filed by me March 22, 1933, Serial No. 662,113, for Treatment of sulphur, which was allowed October 5, 1934.

Earlier discovery reveals the fact that certain inorganic sulphides introduced into molten sulphur will enter into solution, with the consequence and effect that, on cooling, the crystallizing habit that sulphur alone manifests is changed, and the modified sulphur will continue in non-crystalline condition. This invention is grounded in the discovery that certain organic sulphides (among them particular substances for which no solvent has heretofore been known, and which on that account were represented to have peculiar value in the arts) are soluble in sulphur, with the effect of affording a product that manifests in less degree, or not at all, the crystallizing habit of sulphur alone, and a product that, additionally, is plastic, and in that respect useful in ways that the products of the earlier discovery alluded to above are not.

The organic sulphides which here are contemplated include those commonly produced by the interaction of polysulphides or sulphur with olefinic compounds containing the group $C_nH_{2n}$ combined with a negative radical. These products have amorphous characteristics. Typical of them is the product of the reaction of calcium or sodium polysulphide with ethylene dichloride. It is a plastic, rubber-like mass, containing, generally, 82% sulphur, 15.5% carbon, and 2.5% hydrogen. The structure is unknown, but the substance is recognized to be, generally speaking, an organic sulphide, or, with greater likelihood, a polymerization product of an organic sulphide, or of a mixture of organic sulphides. This rubber-like mass, although it will soften as it is heated, manifests no definite melting-point, and it may not be brought by melting to fluid consistency. It is a product now on the market and because of the properties indicated it is represented to be of peculiar value.

When this product is dissolved in sulphur, the solution has properties and characteristics which neither component alone possesses and which make the solution available for new uses. Unlike sulphur, it will continue indefinitely in non-crystalline condition; unlike the sulphide alone, it has a definite melting-point, and, accordingly, the very valuable characteristic that in liquid condition it may be caused to penetrate narrow interstices and may be used as a substance with which to impregnate other bodies. Furthermore, since sulphur is relatively cheap, the solution of the invention is less expensive than the sulphide alone.

In the practice of the invention, the sulphide is formed within a bath of sulphur maintained in molten state at a temperature of 120°–160° C.; and the sulphide as it is formed enters into solution in the molten sulphur of the bath. The temperature is maintained, with stirring if need be, until the mass is homogeneous. It may then be cooled, and is then serviceable.

The rate of solution may be accelerated by the addition of certain organic compounds, such as the chlorinated diphenyls, chlorinated naphthalenes, phenol sulphur chloride resins, camphor, and diphenyl guanidine (D. P. G.). The last named is one of a group of compounds that are used as accelerators in the rubber industry. These compounds also seemingly reduce the viscosity of the resultant solution. In general such compounds do not have the effect in the ultimate produce of plasticizing agents. D. P. G. which is used as an accelerator in the rubber industry has, however, another modifying action, in that the solutions that contain small quantities of it are slightly more crystalline than solutions that lack it. Probably some minor reaction of sulphur with the sulphide takes place. The vastly greater part of the solvent sulphur, however, remains unchanged by any such reaction.

In like manner as organic accelerators, in addition to their primary accelerating effect, have an additional and secondary effect of modifying the characteristics of the solution of sulphide in sulphur, inorganic accelerators may be employed, and with corresponding secondary effect. In one case sulphur that has been plasticized with an arsenic sulphide $As_2S_2$ (as described in an application for Letters Patent filed October 5, 1932, by William A. Hamor and the present applicant. Serial No. 636,337) was used in place of elemental sulphur as a solvent. It was found that 25% of sulphide could be dissolved in sulphur so previously plasticized, and that the viscosity of such solution at 140° C. was much less than the viscosity of a similar solution in elemental sulphur. This is a valuable property, as generally a 25% solution of the sulphide in elemental sulphur is so viscous at 140° C. that it cannot be used for impregnating purposes.

In the practice of the invention an unsaturated hydrocarbon gas, of which ethylene may be named as typical, is caused to bubble through a bath of molten sulphur maintained within the temperature range indicated. Under such conditions reaction occurs—a reaction that may be hastened if a catalyst (copper sulphide, for example) be present. An olefine sulphide is formed that goes directly into solution in the excess sulphur, and the resultant mass is such as that already described.

I have reason to believe that certain organic sulphides, such as the mercaptans, may advantageously be employed, rather than copper sulphide, as an accelerator in such reaction.

In following the procedure of causing olefine gas to bubble through a bath of molten sulphur, it will, of course, be understood that the sulphur bath is that which has previously been specified,— that is to say, a bath of sulphur maintained in molten state at a temperature of 120°–160° C. The temperature limitation is important. The temperature being maintained above the melting-point of sulphur, and yet not more than 160° C., the reaction is not attended (as occurs if the bath of sulphur be of higher temperature) with release of hydrogen sulphide gas,—at least not in any appreciable amount. The significance of this is that the polymers of the olefine sulphides are not broken down. The chain of the olefine molecules takes on sulphur, without a breaking of the chain. The result is a plastic substance. If operation were conducted at higher temperature, characterized by release of hydrogen sulphide (which means the breaking of the molecular chain), the resulting product would be crystalline, and not plastic, and it is the plastic product that has utility within the contemplation of this invention.

If the procedure be carried out under pressure, the described reaction and concomitant solution may, as the chemist realizes, be expedited.

The olefine gas may be in pure, or substantially pure, state, or it may be introduced into the molten sulphur in such diluted state or condition as may be found practicable and convenient. Still gas—that is to say, gas from a petroleum refinery—consists of olefine gas diluted with other hydrocarbons; and still gas, by virtue of its olefine content, is serviceable in the practice of the invention.

Similarly as olefine gas is serviceable, so the other members of the olefine series of unsaturated hydrocarbons, gaseous under the conditions of operation—propylene and butylene, for example—are serviceable. And, similarly, the unsaturated hydrocarbon gases of the acetylene series, to the extent that they are available, are serviceable. In this series it is acetylene itself that is the available member of the series, and it also may be employed with practical success, for the realization of this invention. With any of these gases, the sulphur being maintained at a temperature exceeding its own melting-point, but not at a temperature so high as to effect the breaking down of the derived products, the corresponding reaction will occur: the unsaturated hydrocarbon will take up sulphur, and, the carbon chain remaining unbroken, the so derived sulphide will go into solution in the excess molten sulphur.

The various organic sulphides that have been characterized and described will dissolve in or mix with sulphur in all proportions. The mass resulting from the mixture varies in viscosity, according to the value of the sulphide content. As has also been stated, the viscosity may be modified by the addition of certain organic compounds—or by inorganic compounds, such as arsenic sulphide. When cold also, the properties of the mass depend upon the value of the sulphide content. In general, all such mixtures are plastic. Since the sulphide itself is a very viscous plastic material, it has the effect of delaying the crystallization of the sulphur. To what extent crystallization is delayed or suspended depends upon the value of the sulphide content. Solutions that contain less than 7% of sulphide possess a certain plasticity. Such solutions are, however, difficult to sheet on a rubber mill. Solutions that contain more than 7% of sulphide may be sheeted quite readily on the rubber rolls. By varying the sulphide content, masses can be produced that are hard and semiplastic, and others that are soft and flexible.

These masses differ from both components. Sulphur is brittle, hard, and crystalline. These solutions may be soft, semiplastic, and practically non-crystalline. The sulphide alone is amorphous, flexible, and resembles rubber. Though generally supposed to be insoluble, I have discovered its solubility in sulphur and have found that the solution will vary in plasticity. That the mass is indeed a solution is evidenced by the fact that from it the sulphur may be extracted again.

The solution, plastic as the dissolved sulphide is plastic, has the added characteristic that it can be melted. The sulphide alone is a relatively expensive material. The cost of the solution is much less.

The physical characteristics of the solution may be modified by adding to it chlorinated diphenyls, chlorinated naphthalene, phenol sulphur chloride resins, cotton seed oil, or various other vegetable oils, asphalt or ozokerite, or such sulphides as are produced by allowing China wood oil or oleic acid to react with sulphur. Generally, these substances impart waxy characteristics to the solution. Diphenyl guanidine, on the other hand, seems to render the mass brittle and crystalline. The quantities of these materials required to modify the properties of the solution may vary, but generally do not exceed 0.5%.

The physical properties of the solution may be further modified by using plastic sulphur, such as is produced with the aid of phosphorus or arsenic, instead of elemental sulphur. By this means a product containing 25% of sulphide can be produced, using plastic sulphur containing 5% of a sulphide of arsenic. This mixture is quite fluid at 140° C. Generally, a mixture containing 25% of sulphide and 75% of elemental sulphur is exceedingly viscous at 140°, and cannot be used for impregnating purposes.

The usefulness of solutions of these sulphides in elemental sulphur should be many, as such solutions can be produced with variety of physical characteristics. They may be extruded into various shapes and forms. They may be used to impregnate cellulosic materials, fabrics, cement, stone, etc. They may be used as thin coating films.

They resist abrasion, and can be used to cover materials which are subjected to abrasive influence.

They can be used as bonding agents, in bonding felt to metal, and in bonding various other bodies.

They can be used to line pickling vats, electrolytic cells, acid tanks, and surfaces that come in contact with corrosive salt solutions.

They can be mixed with aggregate and used as cements.

One of their principal uses should be the impregnation of fabrics, etc., for the construction of hose, etc., useful in the conveyance of acids, hydrocarbons, corrosive salt solutions and in the fabrication of flexible ventilators such as are used in mines, etc., packing materials, and flexible diaphragms.

Because such products are flexible, they may be used as substitutes for rubber. They should be valuable as insulating materials.

I claim as my invention:

1. The method herein described of preparing a solution of sulphide in sulphur which consists in maintaining a body of sulphur at a temperature above its melting-point and a temperature less than the break-down temperature of the derived sulphides, and causing unsaturated hydrocarbon in gaseous condition to bubble through the molten sulphur whereby the hydrocarbon taking on sulphur will form a sulphide and the so formed sulphide, without break in the carbon chain, will go into solution in the excess sulphur.

2. The method herein described of preparing a solution of sulphide in sulphur which consists in maintaining a body of sulphur at a temperature above its melting-point and a temperature less than the break-down temperature of the derived sulphides, and causing unsaturated hydrocarbon of the ethylene series in gaseous condition to bubble through the molten sulphur, whereby the hydrocarbon taking on sulphur will form a sulphide and the so formed sulphide, without break in the carbon chain, will go into solution in the excess sulphur.

3. The method herein described of preparing a solution of an olefine sulphide in sulphur which consists in bringing a body of sulphur to molten condition and to a temperature not exceeding 160° C., causing an olefine in gaseous condition to bubble through the bath of molten sulphur, and continuing such operation until the desired result is obtained.

4. The method herein described of preparing a solution of an olefine sulphide in sulphur which consists in bringing a body of sulphur to molten condition and to a temperature not exceeding 160° C., causing an olefine in gaseous condition to bubble through the bath of molten sulphur in the presence of a catalyst, and continuing such operation until the desired result is obtained.

5. The method herein described of producing a plastic substance which consists in maintaining a body of sulphur in molten condition and at a temperature not exceeding 160° C., and dispersing an olefine in the mass, whereby by reaction a portion of such body of sulphur is altered to an olefine sulphide and solution is effected of such newly formed sulphide in the unaltered surplus of molten sulphur.

6. The method herein described of producing a plastic substance which consists in maintaining a body of sulphur in molten condition and at a temperature not exceeding 160° C., and in the presence of a catalyst dispersing an olefine in the molten mass, whereby by reaction a portion of such body of sulphur is altered to an olefine sulphide and solution is effected of such newly formed sulphide in the unaltered surplus of molten sulphur.

7. The method herein described of producing a plastic substance which consists in maintaining a body of sulphur in molten condition and at a temperature not exceeding 160° C., and in the presence of an accelerator dispersing an olefine in such molten mass, whereby by reaction a portion of such body of sulphur is altered to an olefine sulphide and solution is effected of such newly formed sulphide in the unaltered surplus of molten sulphur.

8. The method herein described of producing a plastic substance which consists in maintaining a body of sulphur, in which a crystallization-inhibiting substance is present, in molten condition and at a temperature not exceeding 160° C., and dispersing in such molten mass an olefine, whereby by reaction a portion of such body of sulphur is altered to an olefine sulphide and solution is effected of such newly formed sulphide in the unaltered surplus of molten material.

9. The method herein described of producing a plastic substance which consists in maintaining a body of sulphur, in which an addition of sulphide of arsenic is present, in molten condition and at a temperature not exceeding 160° C., and dispersing in such molten mass an olefine, whereby by reaction a portion of such body of sulphur is altered to an olefine sulphide and solution is effected of such newly formed sulphide in the unaltered surplus of molten material.

10. The method herein described of producing a plastic substance which consists in maintaining a body of sulphur, in which an addition of sulphide of phosphorus is present, in molten condition and at a temperature not exceeding 160° C., and dispersing in such molten mass an olefine, whereby by reaction a portion of such body of sulphur is altered to an olefine sulphide and solution effected of such newly formed sulphide in the unaltered surplus of molten material.

WERNER W. DUECKER.